United States Patent
Romanovskiy et al.

(10) Patent No.: US 9,131,240 B2
(45) Date of Patent: Sep. 8, 2015

(54) VIDEO DECODING METHOD AND APPARATUS WHICH USES DOUBLE BUFFERING

(75) Inventors: Alexey Romanovskiy, Suwon-si (KR); Andrey Kan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1409 days.

(21) Appl. No.: 12/196,675

(22) Filed: Aug. 22, 2008

(65) Prior Publication Data

US 2009/0052542 A1 Feb. 26, 2009

Related U.S. Application Data

(60) Provisional application No. 60/957,566, filed on Aug. 23, 2007, provisional application No. 60/957,618, filed on Aug. 23, 2007.

(30) Foreign Application Priority Data

Feb. 26, 2008 (KR) ........................ 10-2008-0017493

(51) Int. Cl.
*H04N 7/12* (2006.01)
*H04N 19/42* (2014.01)
(Continued)

(52) U.S. Cl.
CPC ............... *H04N 19/42* (2014.11); *H04N 19/44* (2014.11); *H04N 19/61* (2014.11)

(58) Field of Classification Search
CPC ............. G06F 9/30181; G06F 9/3897; G06F 9/30145; G06F 9/3867; G06F 9/3877; G06F 9/3885; G06F 13/385; G06F 15/7867; G06F 2205/066; G06F 2205/067; G06F 5/065; G06F 9/30018; G06F 9/3802; G06F 9/383
USPC ....................................................... 375/240.25
See application file for complete search history.

(56) References Cited

U.S. PATENT DOCUMENTS 5,418,910 A * 5/1995 Siegel .............................. 710/52
6,088,773 A * 7/2000 Kano et al. ..................... 711/161
(Continued)

FOREIGN PATENT DOCUMENTS

JP 2000-175201 6/2000
KR 10-2000-0072875 A 12/2000
(Continued)

OTHER PUBLICATIONS

Korean Office Action issued Jan. 28, 2014 in counterpart Korean Patent Application No. 10-2008-0017493 (2 pages, in Korean).

*Primary Examiner* — Jessica M Prince
(74) *Attorney, Agent, or Firm* — NSIP Law

(57) ABSTRACT

A video decoding method and apparatus, the video decoding apparatus including: a decoder unit to control a video decoding operation; and a multi-core processor to perform the video decoding operation on an input bitstream by using the decoding unit, wherein the multi-core processor includes: a first core to parse the input bitstream into a plurality of slices and to allocate the slices; and a second core to receive one of the slices, to generate a plurality of macroblocks by decoding the received slice, to alternately store the macroblocks in first and second buffers included in an auxiliary memory thereof, to alternately transfer the macroblocks from the first and second buffers to a main memory, and to reconstruct an image for the macroblocks, wherein the macroblocks are transferred from one of the first and second buffers while the macroblocks are stored in the other one of the first and second buffers.

16 Claims, 7 Drawing Sheets

(51) Int. Cl.
*H04N 19/61* (2014.01)
*H04N 19/44* (2014.01)

(56) References Cited

U.S. PATENT DOCUMENTS

| | | | |
|---|---|---|---|
| 6,256,687 B1 * | 7/2001 | Ellis et al. | 710/71 |
| 6,430,533 B1 * | 8/2002 | Kolluru et al. | 704/500 |
| 6,459,737 B1 | 10/2002 | Jiang | |
| 7,236,177 B2 | 6/2007 | Sih et al. | |
| 7,421,026 B2 | 9/2008 | Moon | |
| 7,660,352 B2 * | 2/2010 | Yamane et al. | 375/240.12 |
| 7,796,061 B2 | 9/2010 | Kee | |
| 8,031,772 B2 | 10/2011 | Kim | |
| 8,213,518 B1 * | 7/2012 | Wang et al. | 375/240.25 |
| 2002/0029359 A1 * | 3/2002 | Kiyoi et al. | 714/45 |
| 2004/0174912 A1 | 9/2004 | Moon | |
| 2005/0062746 A1 | 3/2005 | Kataoka et al. | |
| 2006/0064518 A1 * | 3/2006 | Bohrer et al. | 710/22 |
| 2006/0104364 A1 | 5/2006 | Kim | |
| 2006/0155910 A1 * | 7/2006 | Hsieh et al. | 711/5 |
| 2008/0141299 A1 * | 6/2008 | Eyer et al. | 725/32 |
| 2008/0307198 A1 | 12/2008 | Kataoka et al. | |
| 2008/0310555 A1 | 12/2008 | Kee | |

FOREIGN PATENT DOCUMENTS

| | | |
|---|---|---|
| KR | 2002-30269 | 4/2002 |
| KR | 10-2005-0021233 A | 3/2005 |
| KR | 2005-58276 | 6/2005 |
| KR | 10-2006-0053568 A | 5/2006 |
| KR | 10-0801630 B1 | 2/2008 |

\* cited by examiner

FIG. 11

```
NonIntraMacroblock()
{
    StartMotionCompensation();        ~ S601
    ZeroDcPredictions();              ~ S602
    if(mbTypePattern){
        DecodingQuantizerMatrix();    ~ S603
        if (codedBlockPattern&32)
        {
            HuffmanBlockDecoding(block[0]);  ~ S604
            FinishMotionCompensation();      ~ S605
            NonIntraIdct(block[0]);          ~ S606
        }
        else {
            FinishMotionCompensation();      ~ S607
        }
        ...
    }
    else{
        FinishMotionCompensation();   ~ S608
    }
}
```

VIDEO DECODING METHOD AND APPARATUS WHICH USES DOUBLE BUFFERING

CROSS-REFERENCE TO RELATED APPLICATIONS

This application claims priority from U.S. Provisional Application Nos. 60/957,618 filed on Aug. 23, 2007 and 60/957,566 filed on Aug. 23, 2007 in the United States Patent and Trademark Office and Korean Patent Application No. 2008-17493 filed on Feb. 26, 2008 in the Korean Intellectual Property Office, the disclosures of which are incorporated herein by reference in their entireties.

BACKGROUND OF THE INVENTION

1. Field of the Invention

Aspects of the present invention relate to a video decoding method and apparatus, and more particularly, to a multi-core processor-based video decoding method and apparatus that improves a decoding performance.

2. Description of the Related Art

The development of information and communication technology (ICT) including the Internet has increased video communication as well as text and voice communication. As conventional text-oriented communication fails to satisfy various needs of users, multimedia services that can provide various types of information (such as text, images, and music) have increased. Due to its large size, multimedia data requires a large-capacity storage medium. In addition, a wide bandwidth is required to transmit the multimedia data. Therefore, a compression coding method is requisite for transmitting multimedia data including text, images, and audio.

Conventional video coding methods (such as Moving Picture Experts Group (MPEG)-2, MPEG-4, H.263 and H.264) are based on a motion-compensated prediction coding technique. In the conventional video coding methods, temporal redundancy is removed by motion compensation, and spatial redundancy is removed by transform coding. MPEG-2 is a video and audio compression standard that is known as an International Organization for Standardization (ISO)/International Electrotechnical Commission (IEC) 13818-2 video standard. MPEG-2 is an extension of MPEG-1 and is designed to efficiently compress video data used in conventional televisions (TVs) and high-definition (HD) TVs. In addition, MPEG-2 is designed to provide an HD video encoding technique through computer networks.

The MEG-2 video standard compresses video data by removing spatial and temporal redundancies in an image and represents the image without the spatial and temporal redundancies by an agreed-upon bit string of a far shorter length. In order to remove spatial redundancy, discrete cosine transform (DCT) and quantization may be performed on an image to remove high-frequency components to which human eyes are not sensitive and which contain a large amount of information. In addition, in order to remove temporal redundancy (similarity between image frames), similarities between frames may be detected, and image data may not be sent to regions having the similarities. Instead, error components that are created when the regions are represented by corresponding motion vector information and motion vectors may be sent to the regions. In this case, the error components also go through DCT and quantization. Alternatively, a variable length coding (VLC) method, which losslessly compresses bit strings, may be used to allocate far shorter codes to more frequently generated bit strings in consideration of frequency of generation. In particular, DCT coefficients may be represented by a short bit string based on run length codes.

Until recently, a single-core processor has been used for the above video decoding operations. However, since the introduction of a multi-core processor having superior performance, the use of the multi-core processor is increasing in various fields in which a lot of system resources are consumed, including video decoding.

In the case of a functional division method in which a plurality of cores included in a multi-processor processor are designed to respectively perform predetermined functions, it may be easy to implement the multi-core processor. However, since each core performs the respective function at a different time, it is difficult to achieve parallel processing, and the entire performance of the multi-core processor cannot be fully utilized.

In the case of a data division method in which a picture is divided into a plurality of regions and the regions are respectively allocated to a plurality of cores in a multi-core processor, a high level of parallelism may be achieved. However, if data processing processes are dependent on each other, it may be complicated to implement the multi-core processor. To solve this and/or other problems, additional operations (for example, predicting the relation between the size of each piece into which data is divided, and computation load) are utilize, which results in the significant deterioration of the performance of the multi-core processor. In addition, since each core of the multi-core processor has all functions for video decoding, the multi-core processor implementing the data division method is inefficient in terms of the use of system resources.

Therefore, a video decoding method that fully utilizes the performance of a multi-core processor and thus enhances video decoding performance is beneficial.

SUMMARY OF THE INVENTION

Aspects of the present invention provide a multi-core processor-based video decoding method and apparatus that improve decoding performance by interleaving calculations used in a decoding operation with data transfers.

According to an aspect of the present invention, there is provided a video decoding apparatus including: a decoder unit to control a video decoding operation; and a multi-core processor to perform the video decoding operation on an input bitstream by using the decoding unit, wherein the multi-core processor includes: a first core to parse the input bitstream into a plurality of slices and to allocate the slices; and a second core to receive one of the slices from the first core, to generate a plurality of macroblocks by decoding the received slice, to alternately store the macroblocks in first and second buffers included in an auxiliary memory thereof, to alternately transfer the stored macroblocks from the first and second buffers to a main memory, and to reconstruct an image for the macroblocks, wherein the stored macroblocks are transferred from one of the first and second buffers while the macroblocks are stored in the other one of the first and second buffers.

According to another aspect of the present invention, there is provided a video decoding method using a multi-core processor that includes a first core and a second core, the method including: parsing, by the first core, an input bitstream into a plurality of slices and allocating one of the slices to the second core; decoding, by the second core, the allocated slice to generate a plurality of macroblocks; alternately storing the macroblocks in first and second buffers included in an auxiliary memory of the second core and alternately transferring the macroblocks from the first and second buffers to a main memory; and reconstructing an image for the macroblocks, wherein the macroblocks are transferred from one of the first and second buffers while the macroblocks are stored in the other one of the first and second buffers.

According to yet another aspect of the present invention, there is provided a video decoding apparatus including: a decoder unit to control a video decoding operation; and a multi-core processor to perform the video decoding operation on an input bitstream by using the decoding unit, wherein the multi-core processor includes: a first core to parse the input bitstream into a plurality of slices and to allocate the slices; and a second core to receive one of the slices from the first core, to generate a plurality of macroblocks by decoding the received slice, to perform a motion compensation operation on each of the macroblocks, to transfer the motion-compensated macroblocks to a main memory, and to reconstruct an image for the motion-compensated macroblocks, wherein the second core performs another operation that is unaffected by the motion compensation operation while performing the motion compensation operation.

According to still another aspect of the present invention, there is provided a video decoding method using a multi-core processor that includes a first core and a second core, the method including: parsing, by the first core, an input bitstream into a plurality of slices and allocating any one of the slices to the second core; decoding, by the second core, the allocated slice to generate a plurality of macroblocks and performing, by the second core, a motion compensation operation on each of the macroblocks; and transferring the motion-compensated macroblocks to a main memory and reconstructing an image for the motion-compensated macroblocks, wherein another operation that is unaffected by the motion compensation operation is performed while the motion compensation operation is performed.

According to another aspect of the present invention, there is provided a video decoding apparatus to decode an input bitstream, the apparatus including: a decoder unit used to control a video decoding operation on the input bitstream; and a multi-core processor to perform the video decoding operation on the input bitstream by using the decoding unit, the multi-core processor including: a first core to parse the input bitstream into a plurality of slices and to allocate the plurality of slices; and a second core to receive one of the allocated slices from the first core, to generate a plurality of macroblocks by decoding the received slice, to simultaneously perform a first operation on the macroblocks and a second operation, and to reconstruct an image for the macroblocks.

According to yet another aspect of the present invention, there is provided a video decoding method using a multi-core processor that includes a first core and a second core, the method including: allocating, by the first core, a slice of an input bitstream to the second core; and decoding, by the second core, the allocated slice to generate a plurality of macroblocks; simultaneously performing a first operation on the macroblocks and a second operation; and reconstructing an image for the macroblocks.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 11 illustrates a case in which a video decoding apparatus performs motion compensation on non-intra macroblocks according to another embodiment of the present invention.

DETAILED DESCRIPTION OF THE EMBODIMENTS

Figure 1:
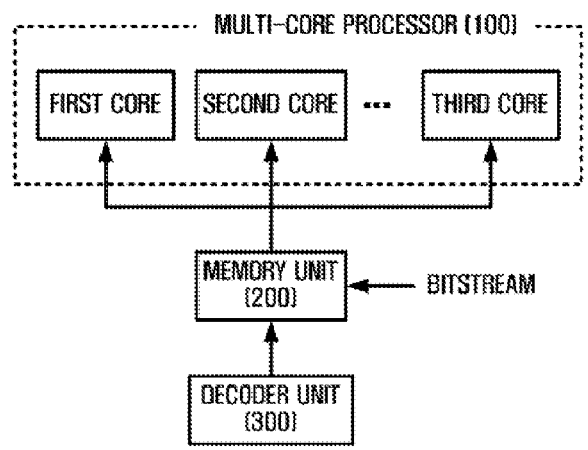
FIG. 1 is a block diagram of a video decoding apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a video decoding method and apparatus according to aspects of the present invention will be described with reference to the attached drawings. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor(s) of the computer or other programmable data processing apparatus, create methods for implementing the operations specified in the flowchart block or blocks.

These computer program instructions may also be stored in a computer-usable or computer-readable memory that can direct a computer or other programmable data processing apparatus to operate in a particular manner, such that the instructions stored in the computer-usable or computer-readable memory produce an article of manufacture including instructions that implement the operation(s) specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the operations specified in the flowchart block or blocks.

And each block of the flowchart illustrations may represent a module, segment, or portion of code, which includes one or more executable instructions to implement the specified logical operation(s). It should also be noted that in some alternative implementations, the operations noted in the blocks may occur out of the order. For example, two blocks shown in succession may in fact be executed substantially concurrently or the blocks may sometimes be executed in the reverse order, depending upon the operations involved.

FIG. 1 is a block diagram of a video decoding apparatus according to an embodiment of the present invention. Referring to FIG. 1, the video decoding apparatus includes a multi-core processor 100, a memory unit 200, and a decoder unit 300.

The multi-core processor 100 is an integrated circuit that includes a plurality of cores in order to achieve better performance, reduce power consumption, and efficiently process a plurality of tasks at a time. The multi-core processor 100 may be a cell broadband engine architecture (CBEA) recently been developed by Sony, Toshiba and IBM (STI) to be used in video decoding apparatuses that consume a lot of system resources.

Figure 2:
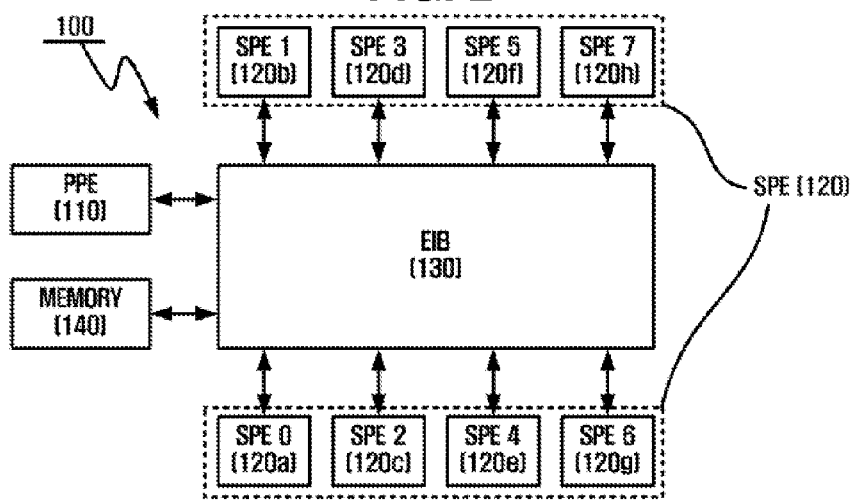
FIG. 2 is a schematic block diagram of a cell broadband engine architecture (CBEA) according to an embodiment of the present invention.

FIG. 2 is a schematic block diagram of a CEBA according to an embodiment of the present invention. The CEBA defines a new processor structure based on a 64-bit power architecture technology and is focused on distributed processing and media-rich applications. Referring to FIG. 2, the CEBA may define a single-chip multiprocessor that includes at least one power processor element (PPE) 110, a plurality of high-performance synergistic processor elements (SPEs) 120, an element interconnect bus (EIB) 130 that is used for communications between the above processor elements 110 and 120, and a memory 140.

Each of the SPEs 120 is an independent processor that can run application programs. The memory 140, which is shared by all processor elements, and direct memory access (DMA) commands enable seamless and efficient communications between all cell processing elements 110 and 120. In addition, since each of the SPEs 120 is not included in a hierarchy of the memory 140, which is a main memory, and, instead, has an independent local store (LS), it may access the memory 140 by using DMA.

The PPE 110 is a 64-bit power architecture processor and a microprocessor core that allocates a task to each of the SPEs 120. Generally, in a CEBA-based system, the PPE 110 runs an operating system (OS) and most of the applications. However, the computation of intensive parts of the OS and applications are offloaded to the SPEs 120.

Each of the SPEs 120 acts as an independent processor and includes a single instruction multiple data (SIMD) architecture for vector and data streaming. In addition, each of the SPEs 120 includes a 256 kilobyte (KB) LS. As shown in FIG. 2, the number of SPEs may be, but is not limited to, eight.

The EIB 130 is a communication path for commands and data between all processor elements on a cell broadband engine (CBE) processor and on-chip controllers for memory and input/output (I/O). Therefore, the EIB 130 works in parallel with the PPE 110 and the SPEs 120, thereby allowing simultaneous data transfers and computations. Since a specific structure of the CEBA is disclosed, a detailed description thereof will be omitted.

Referring back to FIG. 1, the memory unit 200 stores application programs and data. The memory unit 200 may load the decoder unit 300, which will be described later, so that the multi-core processor 100 can decode an input bitstream. In addition, the memory unit 200 may include a buffer or a queue that temporarily stores data before being processed. The memory unit 200 is a module to/from which information can be input or output, such as a hard disk, a flash memory, a compact flash (CF) card, a secure digital (SD) card, a smart media (SM) card, a multimedia card (MMC), or a memory stick. The memory unit 200 may be included in the video decoding apparatus or in a separate apparatus. While the memory unit 200 is not included in the multi-core processor 100 in FIG. 1, it may be included in the multi-core processor 100 in other embodiments of the present invention.

The decoder unit 300 includes various operational modules to perform a video decoding operation on an input bitstream.

Figure 3:
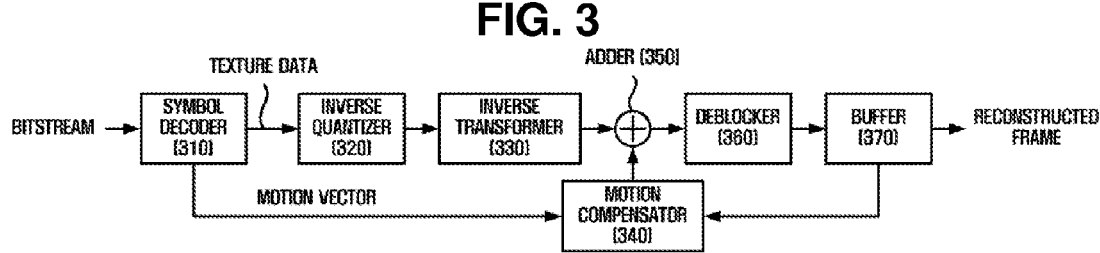
FIG. 3 is a block diagram of a decoder unit shown in FIG. 1.

FIG. 3 is a block diagram of the decoder unit 300 shown in FIG. 1. Referring to FIG. 3, the decoder unit 300 includes operational modules such as a symbol decoder 310, an inverse quantizer 320, an inverse transformer 330, a motion compensator 340, an adder 350, a deblocker 360, and a buffer 370.

The symbol decoder 310 losslessly decodes an input bitstream and obtains a motion vector and texture data. Examples of lossless decoding include Huffman blocking decoding, arithmetic decoding, and variable length decoding. Generally, a motion vector for a specified macroblock is dependent on motion vectors of adjacent macroblocks. That is, the motion vectors for the adjacent macroblocks are obtained first to calculate the motion vector for the specified macroblock. The texture data obtained by the symbol decoder 310 is provided to the inverse quantizer 320, and the motion vector obtained by the symbol decoder 310 is provided to the motion compensator 340.

The inverse quantizer 320 inversely quantizes the texture data provided by the symbol decoder 310. The inverse quantization process restores a value that matches an index generated in a quantization process by using a quantization table used in the quantization process.

The inverse transformer 330 inversely transforms the result of inverse quantization. Specific methods of such inverse transform include an inverse discrete cosine transform (IDCT) and an inverse wavelet transform. The result of the inverse transform (i.e., a reconstructed high-frequency image) is provided to the adder 350.

The motion compensator 340 performs motion compensation on at least one reference frame (which was previously reconstructed and stored in a picture buffer) by using a motion vector for a current macroblock, which is received from the symbol decoder 310, and generates a predicted image. When motion compensation is performed in units of ½ or ¼ pixels, a lot of computation is done in an interpolation process for generating a predicted image. In addition, when motion compensation is performed using two reference frames, an average of motion-compensated macroblocks is calculated. Here, the macroblocks are dependent on each other. Thus, these macroblocks are processed by a single-core processor.

The adder 350 adds the high-frequency image, which is provided by the inverse transformer 330, to the predicted image, which is provided by the motion compensator 340, and reconstructs an image for the current macroblock.

The deblocker 360 applies a deblocking filter to the reconstructed image to remove block artifacts from the reconstructed image. Since a reconstructed image is generally processed in units of macroblocks, noise is generated at each block boundary. Such noise is referred to as block artifacts. The block artifacts tend to increase as the compression rate of video data is increased. The reconstructed image, which passed through the deblocking filter, may be temporarily stored in the buffer 370 and used to reconstruct another image.

Not all macroblocks are reconstructed through motion compensation. Some macroblocks may be coded by intra prediction. Thus, these macroblocks are referred to as intra macroblocks. Intra prediction is a method of reconstructing a current macroblock by using images of other adjacent macroblocks within the same frame. In this case, since the current macroblock is also dependent on other macroblocks, it is processed by a single-core processor.

Figure 4:
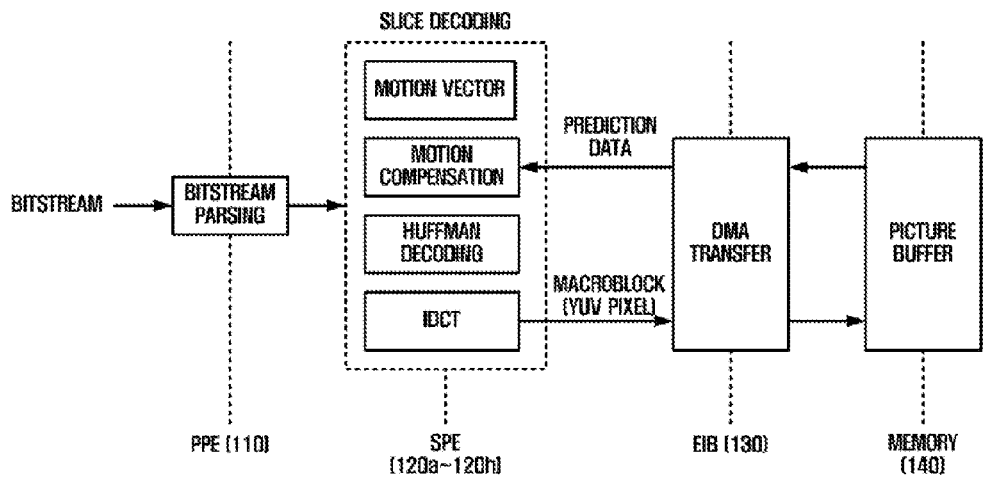
FIG. 4 illustrates a process in which a video decoding apparatus performs a video decoding operation by using a multi-core processor according to an embodiment of the present invention.

FIG. 4 illustrates a process in which a video decoding apparatus performs a video decoding operation by using a multi-core processor 100 according an embodiment of the present invention. A case where the CEBA is used as the multi-core processor 100 will be described below as an example. However, it is understood that aspects of the present invention are not limited thereto, and various modifications can be made by those of ordinary skill in the art.

The PPE 110 parses an input bitstream into a plurality of slices and respectively sends the slices to the SPEs 120. Then, each of the SPEs 120 respectively decodes the slices to generate a plurality of macroblocks. That is, since each of the SPEs 120 in the CEBA can decode any one of the slices by using the decoder unit 300, slice-level concurrency can be implemented. As described above, macroblocks are the results of decoding a slice. Since a process of decoding a slice is disclosed, a detailed description thereof will be omitted.

If each of the SPEs 120 generates a plurality of macroblocks after respectively decoding the slices, the EIB 130 transfers the generated macroblocks from the LS of each of the SPEs 120 to a picture buffer of the memory 140 by using a DMA transfer. More accurately, YUV pixels generated by the inverse transformer 330 may be transferred to the picture buffer of the memory 140. In addition, the EIB 130 may transfer prediction data, which is obtained from picture data stored in the picture buffer, to each of the SPEs 120 by using the DMA transfer.

Figure 5:
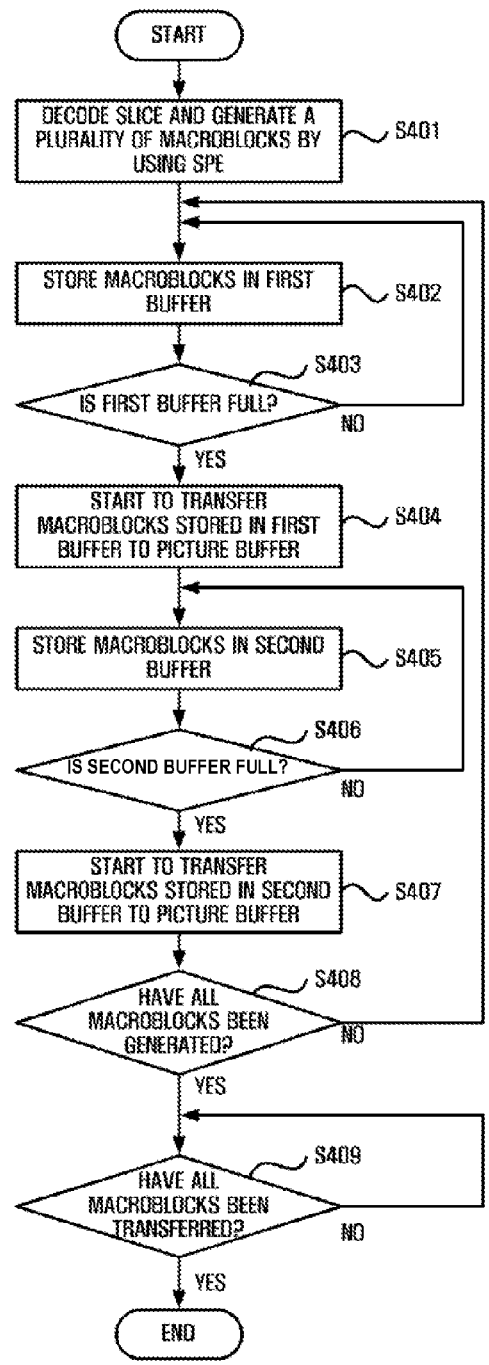
FIG. 5 is a flowchart illustrating a process in which a video decoding apparatus transfers macroblocks according to an embodiment of the present invention.

A method of controlling the video decoding apparatus configured as described above will now be described. FIG. 5 is a flowchart illustrating a process in which a video decoding apparatus transfers macroblocks according to an embodiment of the present invention. As described above with reference to FIG. 4, after the PPE 110 parses an input bitstream into a plurality of slices, each of the SPEs 120 respectively decodes any one of the slices to generate a plurality of macroblocks in operation S401.

Since the size of the LS included in each of the SPEs 120 is approximately 256 KB, the LS may not be big enough to contain a picture buffer. Thus, the generated macroblocks may be transferred to the picture buffer of the main memory 140. Although the macroblocks are transferred to the picture buffer of the memory 140 in the present embodiment, the macroblocks may also be transferred to another one of the SPEs 120 according to another embodiment.

Transferring macroblocks one by one by using the DMA transfer as soon as the macroblocks are generated may be simple but inefficient. According to other aspects of the present invention, the macroblocks are temporarily stored in the LS of each of the SPEs 120 and simultaneously transferred when the LS is full or when a predetermined number of macroblocks have been stored. The number of macroblocks collected in the LS of each of the SPEs 120 may depend on the amount of available memory on each of the SPEs 120.

Figure 6:
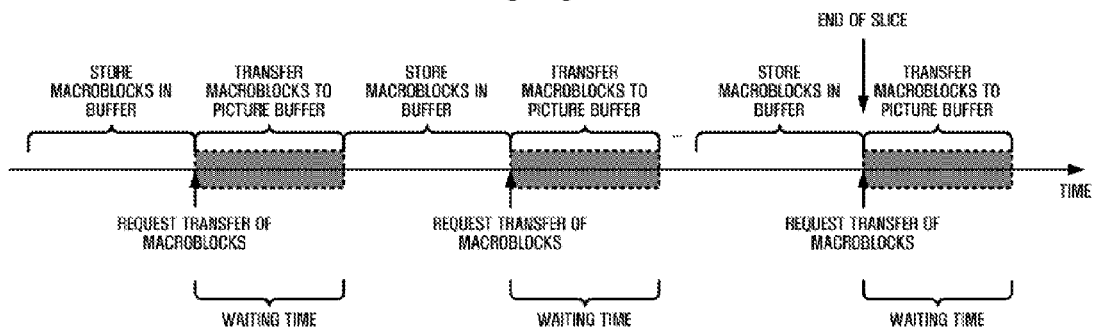
FIG. 6 illustrates a process of transferring macroblocks by using a direct media access (DMA) transfer.

FIG. 6 illustrates a process of transferring macroblocks by using the DMA transfer. Referring to FIG. 6, macroblocks that are generated after a slice is decoded may be stored in a buffer of an LS in each SPE. If the buffer is fully filled with the macroblocks, an EIB starts to transfer the macroblocks collected in the buffer to a picture buffer of a memory.

In this case, a newly generated macroblock is stored in the buffer may overwrite a previously stored macroblock that has not yet been transferred to the picture buffer of the memory. Thus, the newly generated macroblock waits until the previously stored macroblock is transferred. This waiting time results whenever a macroblock stored in the buffer is transferred to the picture buffer of the memory. Thus, the greater the number of macroblocks that are to be transferred, the greater the waiting time. That is, since each of the SPEs 120 cannot decode a slice to generate a macroblock during a waiting time, a decoding operation is delayed.

In this regard, the video decoding apparatus according to aspects of the present invention applies double buffering to the LS of each of the SPEs 120 in order to store and transfer macroblocks. For double buffering, the LS of each of the SPEs 120 includes two buffers (i.e., first and second buffers). Initially, the first buffer may be set active, and the second buffer may be set passive. In addition, the capacity of the first buffer may be set equal to that of the second buffer.

Referring back to FIG. 5, each of the SPEs 120 stores a macroblock in the active first buffer in operation S402. This operation may be repeated until the first buffer is fully filled with macroblocks (operation S403).

Once the first buffer is full (operation S403), the EIB 130 requests (i.e., initiates) the transfer of the macroblocks collected in the first buffer and, thus, starts to transfer the macroblocks to the picture buffer of the memory 140 in operation S404 while storing newly generated macroblocks in the second buffer of the LS in each of the SPEs 120 in operation S405. Here, the states of the first and second buffers are reversed. That is, the first buffer becomes passive while the second buffer becomes active.

If the second buffer is full (operation S406), the EIB 130 initiates the transfer of macroblocks collected in the second buffer to the picture buffer in operation S407. Here, the second buffer becomes passive, and the first buffer becomes active again. Next, it is determined whether all macroblocks have been generated for a corresponding slice in operation S408. If it is determined that there are still some macroblocks to be generated (operation S408), these macroblocks are stored in the first buffer of the LS as soon as they are generated.

Operations 402 through 407 are repeated until all macroblocks for the corresponding slice are generated. When all macroblocks for the corresponding slice are generated (operation S408) (i.e., when the last macroblock of the corresponding slice is generated and stored in the first or second buffer), the transfer of the macroblocks from the first or second buffer (i.e., the active buffer) to the picture buffer of the memory 140 is requested and/or initiated. Accordingly, each of the SPEs 120 suspends a decoding operation until all of the macroblocks are transferred to the picture buffer (operation S409). After the corresponding slice is completely decoded as described above, operations 401 through 409 may be repeated on another slice.

Figure 7:
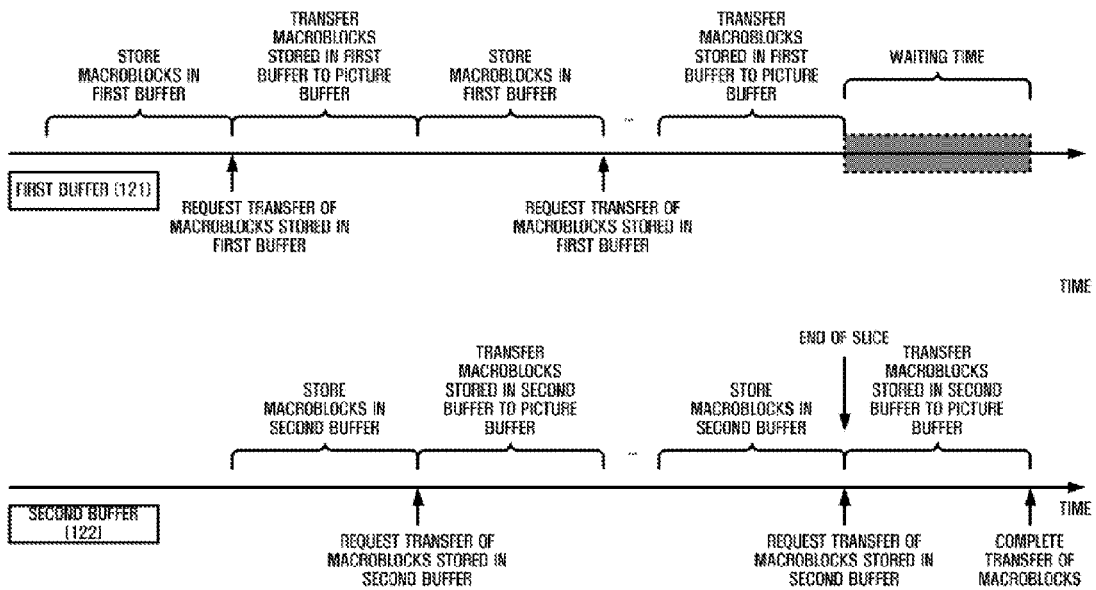
FIG. 7 illustrates a process in which a video decoding apparatus transfers macroblocks by using a DMA transfer according to an embodiment of the present invention.

FIG. 7 illustrates a process in which the video decoding apparatus of FIG. 1 transfers macroblocks by using the DMA transfer according to an embodiment of the present invention. Referring to FIG. 7, macroblocks are repeatedly stored and transferred in/from the first and second buffers in an alternating fashion. More accurately, the transfer of macroblocks is interleaved with the generation and storage of macroblocks. That is, while macroblocks stored in the first buffer are transferred to the picture buffer of the memory 140, newly generated macroblocks are stored in the second buffer. Conversely, while macroblocks stored in the second buffer are transferred to the picture buffer, newly generated macroblocks are stored in the first buffer. Thus, there is no need to wait while macroblocks are transferred from the first or second buffer to the picture buffer (as in the case of FIG. 6). However, since the generation of macroblocks of a corresponding slice may depend on macroblocks of another slice, the decoding operation may be suspended at the end of the corresponding slice until all transfers are completed. However, this happens only once for each slice.

As described above, aspects of the present invention allow a thread on each of the SPEs 120 to continue a decoding operation without waiting until a data transfer is finished. Therefore, the overall workload of the EIB 130 can be reduced, thereby improving the performance of the decoding apparatus.

Since the generation of a macroblock is not affected by the generation of other macroblocks, it is possible to request (i.e., initiate) the transfer of macroblocks when the first or second buffer is fully filled with the macroblocks without waiting until the generation of the macroblock is completed, and to return control to the thread on each of the SPEs 120 immediately so that the thread on each of the SPEs 120 can perform the decoding operation. Consequently, the decoding performance can be enhanced.

The time between requesting the transfer of macroblocks stored in one of the first and second buffers and completing the transfer of the macroblocks may be shorter than the time required to store macroblocks in the other one of the first and second buffers. Thus, the first or second buffer can be immediately ready for storing macroblocks. In FIGS. 5 through 7, the macroblocks are transferred when the first or second buffer is fully filled with macroblocks. However, it is understood that aspects of the present invention are not limited thereto. For example, the transfer of macroblocks may be requested in consideration of the time required to store the macroblocks and the time required to transfer the macroblocks. That is, even when the first buffer is not full yet, the transfer of macroblocks in the first buffer may be requested, and the storing of macroblocks in the second buffer may be initiated.

As described above, the storing of macroblocks is interleaved with the transferring of macroblocks according to aspects of the present invention. Therefore, the decoding performance of the video decoding apparatus can be enhanced while a Moving Picture Experts Group (MPEG)-2 standard, which is known as an International Organization for Standardization (ISO)/International Electrotechnical Commission (IEC) 13818-2 video standard, is met. Consequently, hardware can be utilized more efficiently, and performance can be achieved using hardware with reduced specifications.

In a video decoding method according to another embodiment of the present invention, which will hereinafter be described, an operation that is independent of a motion compensation operation included in a decoding process is interleaved with the motion compensation operation to improve the decoding performance. The configuration and operation of a video decoding apparatus according to another embodiment of the present invention are similar to those of the video decoding apparatus described above with reference to FIGS. 1 through 4, and thus a detailed description thereof will be omitted.

Generally, in an MPEG-2 decoding process, motion vectors obtained from macroblocks of a current image frame are used to perform a motion compensation operation on a previous image frame, wherein the two image frames are arranged successively. In this case, for motion estimation, prediction data (or prediction pixels) is obtained from the previous image frame (i.e., a previously decoded picture that is a reference frame).

As described above with reference to FIG. 4, since a macroblock is transferred to a picture buffer of a memory 140 and reconstructed as a picture, prediction data, which is obtained from a previously reconstructed picture, is transferred to each of SPEs 120 for motion compensation.

Figure 8:
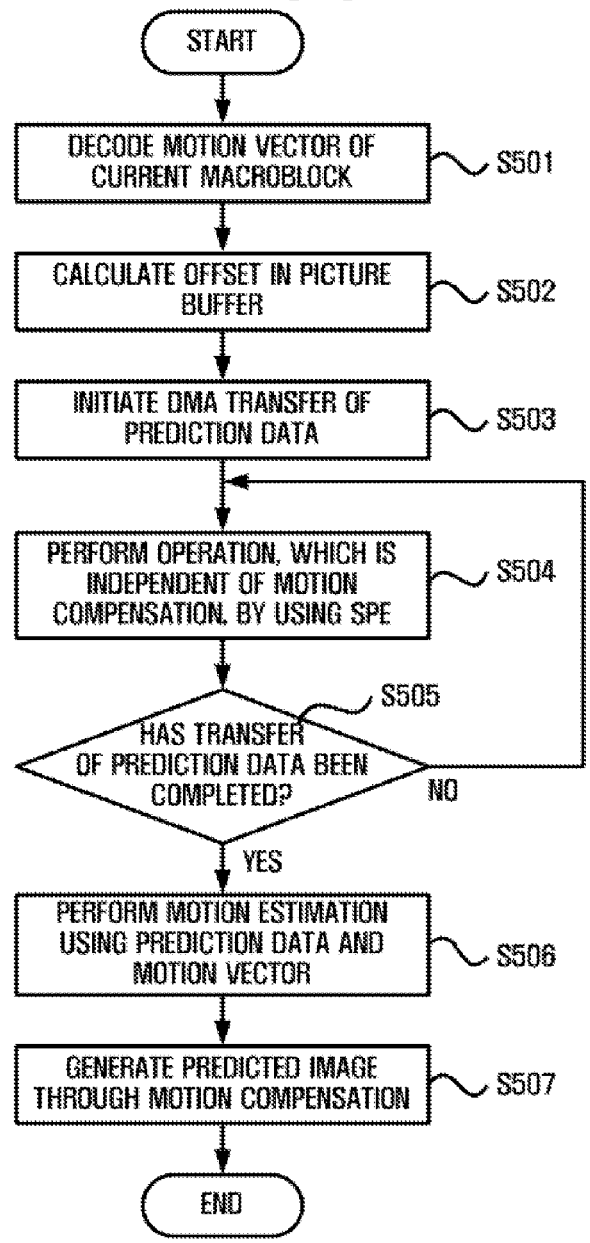
FIG. 8 is a flowchart illustrating a process in which a video decoding apparatus performs motion compensation; according to another embodiment of the present invention

FIG. 8 is a flowchart illustrating a process in which a video decoding apparatus performs motion compensation according to another embodiment of the present invention. Referring to FIG. 8, each of the SPEs 120 decodes motion vectors for macroblocks of a current image frame in operation S501. In addition, an EIB 130 calculates an offset within the picture buffer of the memory 140 in order to obtain prediction data from a previously decoded picture (a reference frame) in operation S502. Then, the EIB 130 initiates the DMA transfer of the prediction data to an LS of each of the SPEs 120 in operation S503. Operations S501 through S503 are a preparation stage of the motion compensation operation. After the preparation stage, the DMA transfer of the prediction data is initiated.

Once the DMA transfer of the prediction data is initiated, each of the SPEs 120 performs an operation that is independent of (i.e., unaffected by) the motion compensation operation in operation S504.

Figure 9:
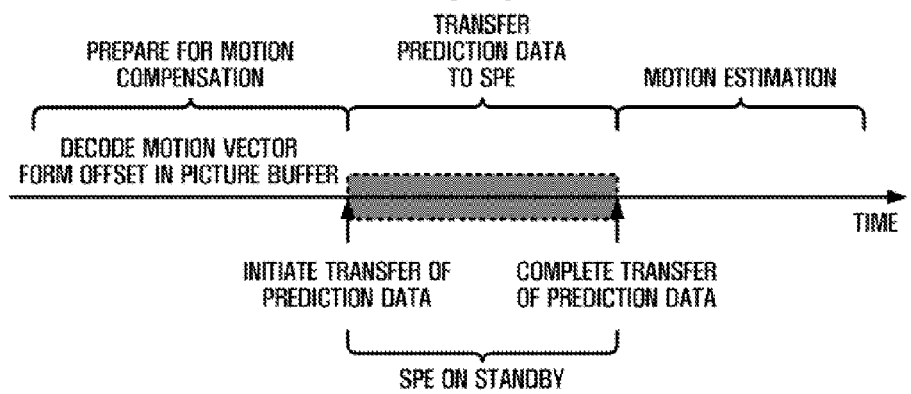
FIG. 9 illustrates a process in which a video decoding apparatus performs motion compensation.

FIG. 9 illustrates a process in which a video decoding apparatus performs motion compensation. Referring to FIG. 9, after the preparation stage of the motion compensation operation, each SPE of the conventional video decoding apparatus remains on standby until the transfer of prediction data thereto is completed. After the transfer of the prediction data is completed, each SPE performs motion estimation. Thus, the entire decoding operation is delayed by a waiting time during which each SPE waits for the transfer of the prediction data to finish.

However, the video decoding apparatus according to another embodiment of the present invention enables each of the SPEs 120 to perform another task while prediction data is transferred to each of the SPEs 120.

Figure 10:
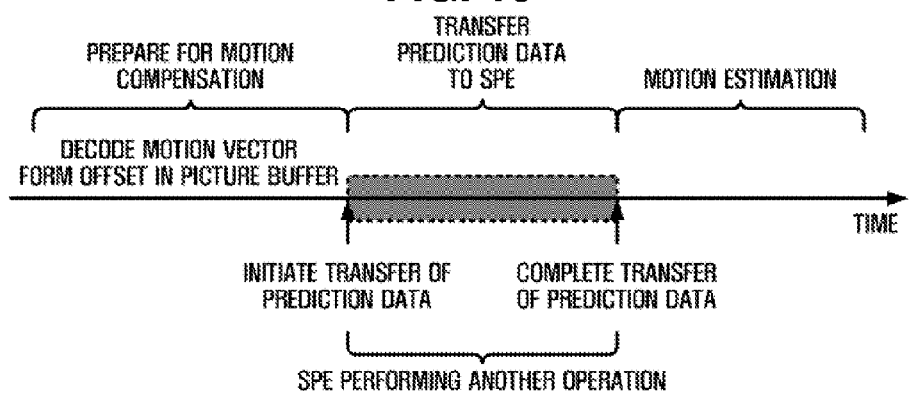
FIG. 10 illustrates a process in which a video decoding apparatus performs motion compensation according to another embodiment of the present invention.

FIG. 10 illustrates a process in which the video decoding apparatus performs motion compensation according to another embodiment of the present invention. Referring to FIG. 10, if the transfer of prediction data is initiated after the preparation stage of the motion compensation operation, each of the SPEs 120 performs another operation included in the decoding process. In this case, each of the SPEs 120 performs an operation that is unaffected by (i.e., independent of) the result of the motion compensation operation. For example, each of the SPEs 120 may perform Huffman block decoding or quantizer matrix decoding.

Referring back to FIG. 8, each of the SPEs 120 performs an operation that is independent of the motion compensation operation until the transfer of the prediction data is completed (operation S505). Once the transfer of the prediction data is completed (operation S505), each of the SPEs 120 performs motion estimation by using the received prediction data and a motion vector obtained from a current macroblock in operation S506. Finally, a predicted image is generated after motion compensation is performed through motion estimation in operation S507.

The video decoding method according to aspects of the present invention may be applied to all types of macroblocks (such as intra macroblocks, non-intra macroblocks, and skipped macroblocks).

FIG. 11 illustrates a case in which a video decoding apparatus performs motion compensation on non-intra macroblocks according to another embodiment of the present invention. Referring to FIG. 11, the preparation stage of motion compensation is first performed in operation S601 in order to perform motion compensation on non-intra macroblocks. During the DMA transfer of prediction data, zeroing DC prediction (operation S602), quantizer matrix decoding (operation S603), and Huffman block decoding (operation S604) are performed depending on conditions. It can be understood from FIG. 11 that each of the SPEs 120 may perform at least zeroing DC prediction (operation S602) during the DMA transfer of the prediction data. Finally, once the DMA transfer of the prediction data is completed, motion estimation is performed using the prediction data (operations S605, S607 or S608). In this case, a 'StartMotionCompensation( )' function may include a function for decoding a motion vector, a function for calculating an offset in the memory 140, and a function for initiating the DMA transfer. In addition, a 'FinishMotionCompensation( )' function may include a function for motion estimation.

After the motion compensation operation, non-intra IDCT (operation S606) is formed to meet the MPEG-2 standard that is known as the ISO/IEC 13818-2 video standard. While the case where the video decoding apparatus according to another embodiment of the present invention performs motion compensation on non-intra macroblocks has been described above, the above motion compensation operation may also be performed on intra macroblocks and skipped macroblocks in other embodiments.

As described above with reference to FIGS. 8-11, the video decoding apparatus according to another embodiment of the present invention interleaves the motion compensation operation with an operation that is independent of the motion compensation operation. Therefore, the decoding performance of the video decoding apparatus can be enhanced while the MPEG-2 standard, which is known as the ISO/IEC 13818-2 video standard, is met. Consequently, hardware can be utilized more efficiently, and better performance can be achieved using hardware with reduced specifications.

The term 'unit', as used herein, is, but is not limited to, a software or hardware component, such as a Field Programmable Gate Array (FPGA) or Application Specific Integrated Circuit (ASIC), that performs certain tasks. A unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and units may be combined into fewer components and units or further separated into additional components and units. In addition, the components and units may be implemented to execute one or more central processing units (CPUs) in a device or a security multimedia card.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A video decoding apparatus to decode an input bitstream, the apparatus comprising:
a decoder unit configured to control a video decoding operation on the input bitstream; and
a multi-core processor configured to perform the video decoding operation on the input bitstream using the decoding unit, the multi-core processor comprising:
a first core configured to parse the input bitstream into a plurality of slices and to allocate the plurality of slices; and
a second core to receive an allocated slice from the first core, to generate a plurality of macroblocks by decoding the received slice, to store the plurality of macroblocks in first and second buffers included in an auxiliary memory thereof, to transfer the stored macroblocks from the first and second buffers to a main memory, and to reconstruct an image for the macroblocks,
wherein the second core transfers the stored macroblocks from one of the first and second buffers to the main memory while the second core simultaneously stores the macroblocks in the other buffer from among the first and second buffers, and
wherein the first and second buffers repeatedly store and transfer macroblocks in turns,
wherein the second core repeatedly stores the macroblocks in the first buffer, transfers the macroblocks stored in the first buffer to the main memory while storing the macroblocks in the second buffer in response to the first buffer being full, and transfers the macroblocks stored in the second buffer to the main memory while storing the macroblocks in the first buffer, in response to the second buffer being full, until all of the plurality of macroblocks for the received slice are transferred to the main memory.

2. The apparatus as claimed in claim 1, wherein the auxiliary memory is implemented in the second core and the main memory is implemented outside of the second core in the multi-core processor.

3. The apparatus as claimed in claim 1, wherein the second core repeatedly stores the macroblocks in the first buffer, transfers the macroblocks stored in the first buffer to the main memory while storing the macroblocks in the second buffer in response to the first buffer storing a predetermined number of the macroblocks, and transfers the macroblocks stored in the second buffer to the main memory while storing the macroblocks in the first buffer in response to the second buffer storing the predetermined number of the macroblocks, until all of the plurality of macroblocks for the received slice are transferred to the main memory.

4. The apparatus as claimed in claim 1, wherein, until all of the plurality of macroblocks for the received slice are transferred to the main memory, the second core repeatedly stores a predetermined number of the macroblocks in the first buffer, transfers the macroblocks stored in the first buffer to the main memory while storing the macroblocks in the second buffer until all of the macroblocks stored in the first buffer are transferred, and transfers the macroblocks stored in the second buffer to the main memory while storing the macroblocks in the first buffer until all of the macroblocks stored in the second buffer are transferred.

5. The apparatus as claimed in claim 1, wherein the macroblocks are transferred to the main memory by using direct memory access (DMA).

6. The apparatus as claimed in claim 1, wherein:
the multi-core processor is a cell broadband engine architecture (CEBA) comprising at least one power processor element (PPE), a plurality of synergistic processor elements (SPEs), and an element interconnection bus (EIB) controlling the at least one PPE and the SPEs; and the first core is the at least one PPE, and the second core is one of the SPEs.

7. A video decoding method using a multi-core processor that comprises a first core and a second core, the method comprising:
parsing, by the first core, an input bitstream into a plurality of slices and allocating a slice to the second core; and
decoding, by the second core, the allocated slice to generate a plurality of macroblocks;
storing the plurality of macroblocks in first and second buffers included in an auxiliary memory of the second core and transferring the stored macroblocks from the first and second buffers to a main memory; and
reconstructing an image for the macroblocks,
wherein the stored macroblocks are transferred by the second core from one of the first and second buffers to the main memory while the macroblocks are simultaneously stored by the second core in the other buffer from among the first and second buffers, and
wherein the first and second buffers repeatedly store and transfer macroblocks in turns,
wherein the alternate storing of the macroblocks and the transferring of the macroblocks comprises
storing the macroblocks in the first buffer until the first buffer is full, transferring the macroblocks stored in the first buffer to the main memory while storing the macroblocks in the second buffer in response to the first buffer being full, and
transferring the macroblocks stored in the second buffer to the main memory while storing the macroblocks in the first buffer in response to the second buffer being full,
wherein the storing of the macroblocks in the first buffer, the transferring of the macroblocks stored in the first buffer while storing the macroblocks in the second buffer, and the transferring of the macroblocks stored in the second buffer while storing the macroblocks in the first buffer are repeated until all of the plurality of macroblocks for the slice allocated to the second core are transferred to the main memory.

8. The method as claimed in claim 7, wherein the auxiliary memory is implemented in the second core, and the main memory is implemented outside of the second core in the multi-core processor.

9. The method as claimed in claim 7, wherein the storing of the macroblocks and the transferring of the macroblocks comprises:
storing the macroblocks in the first buffer until the first buffer stores a predetermined number of the macroblocks;
transferring the macroblocks stored in the first buffer to the main memory while storing the macroblocks in the second buffer in response to the first buffer storing the predetermined number of the macroblocks; and
transferring the macroblocks stored in the second buffer to the main memory while storing the macroblocks in the first buffer in response to the second buffer storing the predetermined number of the macroblocks,
wherein the storing of the macroblocks in the first buffer, the transferring of the macroblocks stored in the first buffer while storing the macroblocks in the second buffer, and the transferring of the macroblocks stored in the second buffer while storing the macroblocks in the first buffer are repeated until all of the plurality of macroblocks for the slice allocated to the second core are transferred to the main memory.

10. The method as claimed in claim 7, wherein the storing of the macroblocks and the transferring of the macroblocks comprises:
storing a predetermined number of the macroblocks in the first buffer;
transferring the macroblocks stored in the first buffer to the main memory while storing the macroblocks in the second buffer until all of the macroblocks stored in the first buffer are transferred; and
transferring the macroblocks stored in the second buffer to the main memory while storing the macroblocks in the first buffer until all of the macroblocks stored in the second buffer are transferred,
wherein the storing of the macroblocks in the first buffer, the transferring of the macroblocks stored in the first buffer while storing the macroblocks in the second buffer, and the transferring of the macroblocks stored in the second buffer while storing the macroblocks in the first buffer are repeated until all of the plurality of macroblocks for the slice allocated to the second core are transferred to the main memory.

11. The method as claimed in claim 7, wherein the macroblocks are transferred to the main memory by using direct memory access (DMA).

12. The method as claimed in claim 7, wherein:
the multi-core processor is a cell broadband engine architecture (CEBA) comprising at least one power processor element (PPE), a plurality of synergistic processor elements (SPEs), and an element interconnection bus (EIB) controlling the at least one PPE and the SPEs; and
the first core is the at least one PPE, and the second core is one of the SPEs.

13. A non-transitory computer readable recording medium encoded with the method of claim 7 and implemented by a computer.

14. A video decoding apparatus to decode an input bitstream, the apparatus comprising:
a decoder unit configured to control a video decoding operation on the input bitstream; and
a multi-core processor configured to perform the video decoding operation on the input bitstream using the decoding unit, the multi-core processor comprising:
a first core configured to parse the input bitstream into a plurality of slices and to allocate the plurality of slices; and
a second core configured to receive an allocated slice from the first core, to decode the received slice, to store the decoded slice in a second buffer while simultaneously transferring another decoded slice from a first buffer to a main memory, and to reconstruct an image using the decoded slicer,
wherein the second core repeatedly stores the macroblocks in the first buffer, transfers the macroblocks stored in the first buffer to the main memory while storing the macroblocks in the second buffer in response to the first buffer being full, and transfers the macroblocks stored in the second buffer to the main memory while storing the macroblocks in the first buffer, in response to the second buffer being full, until all of the plurality of macroblocks for the received slice are transferred to the main memory.

15. A video decoding method using a multi-core processor that comprises a first core and a second core, the method comprising:
allocating, by the first core, a slice of an input bitstream to the second core;
decoding, by the second core, the allocated slice;

storing, by the second core, the decoded slice in a second buffer while simultaneously transferring, by the second core, another decoded slice from a first buffer to a main memory; and reconstructing an image using the decoded slice, wherein the alternate storing of the macroblocks and the transferring of the macroblocks comprises storing the macroblocks in the first buffer until the first buffer is full, transferring the macroblocks stored in the first buffer to the main memory while storing the macroblocks in the second buffer in response to the first buffer being full, and transferring the macroblocks stored in the second buffer to the main memory while storing the macroblocks in the first buffer in response to the second buffer being full, wherein the storing of the macroblocks in the first buffer, the transferring of the macroblocks stored in the first buffer while storing the macroblocks in the second buffer, and the transferring of the macroblocks stored in the second buffer while storing the macroblocks in the first buffer are repeated until all of the plurality of macroblocks for the slice allocated to the second core are transferred to the main memory.

16. A non-transitory computer readable recording medium encoded with the method of claim 15 and implemented by a computer.

\* \* \* \* \*